Patented Mar. 19, 1946                                                                                     2,396,873

UNITED STATES PATENT OFFICE 2,396,873

GLASS ENAMEL COMPOSITIONS

Robert F. Morrison, Elyria, and William C. Morris, South Euclid, Ohio, assignors to The Harshaw Chemical Company, Elyria, Ohio, a corporation of Ohio No Drawing. Application September 28, 1944, Serial No. 556,291

11 Claims. (Cl. 106—49)

This invention relates to low fusing enamels suitable for application to glass, and to glass articles having such enamels applied thereon. More specifically, the invention relates to lead borosilicate glazes containing compounds of columbium and tantalum.

Prior to this invention it has been proposed to utilize zirconium oxide, barium stannate, barium zirconate, etc. for imparting alkali resistance to low melting lead glazes. Titania is used for imparting acid resistance to such glazes.

We have now discovered that columbium and tantalum are capable of imparting alkali resistance to lead borosilicate glazes. The compounds of these elements which we prefer to use are the pentoxides ($Cb_2O_5$ and $Ta_2O_5$), and the columbates and tantalates of barium and zirconium. We may also utilize the columbates and tantalates of thorium, praesodymium, neodymium and lanthanum as well as those of lead, calcium and strontium. The lower oxides, $CbO_2$ and $Ta_2O_4$, which oxidize to the pentoxides can be used in the smelter batch as well as other materials yielding any of the compounds noted during smelting.

These compounds may be utilized in lead borosilicate glazes to the extent of from ½% to 10% by weight based upon the weight of the glaze less pigment and indifferent materials, if any, present. An optimum proportion is from 2% to 5%.

Suitable composition ranges on the analytical basis, i. e., theoretical melted composition, are as follows: lead oxide 40 to 60 per cent, silica 22 to 32 per cent, boric oxide 3 to 12 per cent, titania 0 to 5 per cent, preferably 2 to 4 per cent, alkali ($Na_2O$, $Li_2O$, $K_2O$) 3 to 7 per cent, preferably about 5 per cent, barium oxide 0 to 6 per cent, preferably 1 to 5 per cent, cadmium oxide 0 to 5 per cent, and one or a mixture of compounds of the class consisting of pentoxides of columbium and tantalum, and columbates and tantalates of barium, strontium, calcium, lead, zirconium, thorium, praesodymium, neodymium and lanthanum from ½ to 10 per cent, preferably 2 to 5 per cent. These percentages may be based upon the combined weight of the materials named when it is more convenient since the result usually is approximately the same.

Columbium and tantalum occur together in columbite and other ores in varying proportions. Mixtures of these elements from any of such ores are suitable for our purposes and are referred to herein as "columbium-tantalum" compounds as, "columbium-tantalum pentoxide" or as various "columbate-tantalates" as, "barium columbate-tantalate."

By referring to composition ranges on the analytical basis or to melted compositions, we intend to indicate that the constituent oxides will be found on analysis in those proportions, but we do not intend to indicate the kind of physical or chemical association which may exist in the glaze itself.

In the following table, we have indicated several examples of smelter batch compositions and the resulting theoretical melted compositions.

| Sample number | 1 | 2 | 3 | 4 |
|---|---|---|---|---|

SMELTER BATCH (PARTS BY WEIGHT)

| | | | | |
|---|---|---|---|---|
| Sodium silicate [1] | 10.00 | 10.50 | 9.75 | 10.00 |
| Titansil [2] | 6.00 | 6.50 | 6.75 | 6.05 |
| Lead monosilicate | 52.92 | 52.00 | 52.50 | 53.15 |
| Zinc oxide | 0.88 | 1.00 | 0.90 | 0.86 |
| Cadmium hydrate | 2.60 | 3.00 | 2.60 | 2.60 |
| Boric acid | 7.65 | 7.50 | 7.50 | 7.70 |
| Silica | 13.10 | 12.00 | 13.00 | 13.10 |
| Barium carbonate | 0.35 | | 0.60 | 0.34 |
| Barium fluoride | 3.00 | 3.00 | 2.50 | 3.00 |
| Columbium—tantalum pentoxide | 3.50 | | | |
| Tantalum pentoxide | | 4.50 | | |
| Barium columbate | | | | 3.90 |
| Zirconium columbate | | | 3.90 | |

[1] $Na_2O$, 25%; $SiO_2$, 75%.
[2] $TiO_2$, 32%; $SiO_2$, 24%; $Na_2O$, 25%; $CO_2$, 19%.

THEORETICAL MELTED COMPOSITION (PARTS BY WEIGHT)

| | | | | |
|---|---|---|---|---|
| $Na_2O$ | 4.08 | 4.34 | 4.22 | 4.06 |
| BaO | 0.28 | | 0.50 | 0.27 |
| PbO | 47.50 | 46.52 | 47.00 | 47.20 |
| ZnO | 0.93 | 1.05 | 0.95 | 0.90 |
| CdO | 2.40 | 2.87 | 2.40 | 2.39 |
| $B_2O_3$ | 4.54 | 4.45 | 4.47 | 4.54 |
| $SiO_2$ | 31.40 | 30.70 | 31.42 | 31.40 |
| $TiO_2$ | 2.02 | 2.20 | 2.28 | 2.02 |
| $Cb_2O_5+Ta_2O_5$ [1] | 3.68 | | | |
| $Ta_2O_5$ | | 4.72 | | |
| Barium columbate | | | | 4.08 |
| Zirconium columbate | | | 4.12 | |
| $BaF_2$ | 3.17 | 3.15 | 2.64 | 3.14 |

[1] 78% $Cb_2O_5$ and 22% $Ta_2O_5$

These examples are merely representative of many compositions possible according to the invention. Lead borosilicate is the fundamental basis of the enamel which may contain various proportions of the oxides of lead, sodium, barium, boron and silicon according to desired maturing temperature, coefficient of expansion, etc., all of which is understood by persons skilled in the art. Fluorides of barium, sodium, etc. may be used in the batch and in such cases, the resulting glaze will contain fluorine. Titania functions to improve acid resistance and the amount is not critical. If acid resistance is not essential, titania can be omitted. Cadmium oxide is present in these examples to condition the frit for use of a cadmium color to be introduced as a mill addition.

The ingredients of the batch are smelted sufficiently to produce a clear melt which is then fritted in the usual manner and is ready to be ground with suitable mill additions in the preparations of the enamel. The most important mill additions are, of course, pigments either white or colored. Normally we make up the batch such as indicated in the examples, melt it to a clear melt, frit it into water and then grind the frit with the pigment and other usual mill additions. It is possible, of course, to add some pigments in the batch, that is, as smelter additions, but we prefer to add them at the mill. The pigment selected should be such that when the enamel is applied to glass and fused on the pigment particles do not melt. Thus the enamel consists of pigment particles dispersed in a melted glaze matrix of the compositions indicated above.

Having thus described our invention, what we claim is:

1. A lead borosilicate glaze composition suitable for decorating glassware, having a fusing temperature not higher than 640° C. and exhibiting superior alkali resistance, said glaze composition comprising a lead borosilicate type of glaze composition and also containing a material of the class consisting of pentoxides of columbium and tantalum, and columbates and tantalates of barium, strontium, calcium, lead, zirconium, thorium, praesodymium, neodymium, lanthanum and mixtures thereof.

2. A lead borosilicate glaze suitable for decorating glassware, having a fusing temperature not higher than 640° C. and exhibiting superior alkali resistance, said glaze comprising a pigment dispersed in a glaze matrix of lead borosilicate type and said matrix containing as smelted in addition for imparting high alkali resistance a material of the class consisting of pentoxides of columbium and tantalum, and columbates and tantalates of barium, strontium, calcium, lead, zirconium, thorium, praesodymium, neodymium, lanthanum and mixtures thereof in proportion from ½% to 10% by weight.

3. A lead borosilicate glaze suitable for decorating glassware, having a fusing temperature not higher than 640° C. and exhibiting superior alkali resistance, said glaze comprising a pigment dispersed in a glaze matrix of lead borosilicate type and said matrix containing as smelted in addition for imparting high alkali resistance a material of the class consisting of pentoxides of columbium and tantalum, and columbates and tantalates of barium, strontium, calcium, lead, zirconium, thorium, praesodymium, neodymium, lanthanum and mixtures thereof in proportion from 2% to 5% by weight.

4. A glass article having at least a portion of its surface coated with the glaze defined in claim 2.

5. A lead borosilicate glaze of low melting point suitable for decorating glassware and exhibiting high resistance to alkalies, said glaze comprising a pigment dispersed in a melted matrix, said matrix containing, on the analytical basis, the oxides of lead, silicon, sodium and boron and also a material of the class consisting of pentoxides of columbium and tantalum, and columbates and tantalates of barium, strontium, calcium, lead, zirconium, thorium, praesodymium, neodymium, lanthanum and mixtures thereof, said material constituting from ½% to 10% of the glaze by weight.

6. A lead borosilicate glaze of low melting point suitable for application to glass and comprising a pigment and a melted glaze matrix, said matrix being on the analytical basis composed of the following oxides in approximately the proportions indicated:

| | | |
|---|---|---|
| PbO | parts by weight | 40 to 60 |
| Na$_2$O+Li$_2$O+K$_2$O | do | 3 to 7 |
| BaO | do | 0 to 6 |
| SiO$_2$ | do | 22 to 32 |
| B$_2$O$_3$ | do | 3 to 12 |
| TiO$_2$ | do | 0 to 5 |
| A material of the class consisting of pentoxides of columbium and tantalum, and columbates and tantalates of barium, strontium, lead, calcium, zirconium, thorium, praesodymium, neodymium, lanthanum and mixtures thereof | per cent | ½ to 10 |

7. A lead borosilicate glaze of low melting point suitable for application to glass and comprising a pigment and a melted glaze matrix, said matrix being on the analytical basis composed of the following oxides in approximately the proportions indicated:

| | | |
|---|---|---|
| PbO | parts by weight | 40 to 60 |
| Na$_2$O+Li$_2$O+K$_2$O | do | 3 to 7 |
| BaO | do | 0 to 6 |
| SiO$_2$ | do | 22 to 32 |
| B$_2$O$_3$ | do | 3 to 12 |
| TiO$_2$ | do | 0 to 5 |
| Zirconium columbate-tantalate | per cent | ½ to 10 |

8. A lead borosilicate glaze of low melting point suitable for application to glass and comprising a pigment and a melted glaze matrix, said matrix being on the analytical basis composed of the following oxides in approximately the proportions indicated:

| | | |
|---|---|---|
| PbO | parts by weight | 40 to 60 |
| Na$_2$O+Li$_2$O+K$_2$O | do | 3 to 7 |
| BaO | do | 0 to 6 |
| SiO$_2$ | do | 22 to 32 |
| B$_2$O$_3$ | do | 3 to 12 |
| TiO$_2$ | do | 0 to 5 |
| Barium columbate-tantalate | per cent | ½ to 10 |

9. A lead borosilicate glaze of low melting point suitable for application to glass and comprising a pigment and a melted glaze matrix, said matrix being on the analytical basis composed of the following oxides in approximately the proportions indicated:

| | | |
|---|---|---|
| PbO | parts by weight | 40 to 60 |
| Na$_2$O+Li$_2$O+K$_2$O | do | 3 to 7 |
| BaO | do | 0 to 6 |
| SiO$_2$ | do | 22 to 32 |
| B$_2$O$_3$ | do | 3 to 12 |
| TiO$_2$ | do | 0 to 5 |
| Columbium-tantalum pentoxide | per cent | ½ to 10 |

10. A lead borosilicate glaze composition suitable for decorating glassware, having a fusing temperature not higher than 640° C. and exhibiting superior alkali resistance, said glaze composition comprising a lead borosilicate type of glaze composition and also containing an oxy compound of columbium.

11. A lead borosilicate glaze composition suitable for decorating glassware, having a fusing temperature not higher than 640° C. and exhibiting superior alkali resistance, said glaze composition comprising a lead borosilicate type of glaze composition and also containing an oxy compound of tantalum.

ROBERT F. MORRISON.
WILLIAM C. MORRIS.